United States Patent
Foster et al.

(10) Patent No.: US 6,811,123 B1
(45) Date of Patent: Nov. 2, 2004

(54) STORE EJECTION SYSTEM WITH INTEGRAL ISOLATION VALVE AND ASSOCIATED EJECTION METHOD

(75) Inventors: John K. Foster, St. Peters, MO (US); Thaddeus M. Jakubowski, Jr., St. Charles, MO (US); Cory G. Keller, Fenton, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/780,202

(22) Filed: Feb. 17, 2004

(51) Int. Cl.[7] .................................................. B64D 1/12
(52) U.S. Cl. .................. 244/137.4; 89/1.54; 294/82.26
(58) Field of Search .......................... 244/137.4, 137.1; 89/1.59, 1.54, 1.53; 294/82.16, 82.24, 82.26, 82.36

(56) References Cited

U.S. PATENT DOCUMENTS

| | | |
|---|---|---|
| 3,787,012 A | 1/1974 | Jakubowski, Jr. |
| 3,887,150 A | 6/1975 | Jakubowski, Jr. |
| 4,043,525 A | 8/1977 | Jakubowski, Jr. |
| 4,095,762 A | 6/1978 | Holt |
| 4,204,456 A | 5/1980 | Ward |
| 4,347,777 A | 9/1982 | Jakubowski, Jr. et al. |
| 4,552,327 A | 11/1985 | Carter |
| 4,746,083 A | 5/1988 | Dupin et al. |
| 4,905,568 A | 3/1990 | Hetzer et al. |
| 5,029,776 A * | 7/1991 | Jakubowski et al. ..... 244/137.4 |
| 5,238,209 A | 8/1993 | Hornyak |
| 5,409,187 A | 4/1995 | Dunham |
| 5,411,225 A | 5/1995 | Lannon et al. |
| 5,583,312 A * | 12/1996 | Jakubowski, Jr. ............. 89/1.54 |
| 5,857,647 A | 1/1999 | Jakubowski, Jr. |
| 5,907,118 A | 5/1999 | Jakubowski, Jr. et al. |
| 6,035,759 A | 3/2000 | Jakubowski, Jr. et al. |
| 6,347,768 B1 | 2/2002 | Jakubowski, Jr. et al. |
| 6,663,049 B1 * | 12/2003 | Jakubowski et al. ..... 244/137.4 |
| 6,676,083 B1 * | 1/2004 | Foster et al. .............. 244/137.4 |
| 2003/0094672 A1 * | 5/2003 | Torvik et al. ................ 257/565 |
| 2004/0016848 A1 * | 1/2004 | Jakubowski et al. ..... 244/137.4 |
| 2004/0016849 A1 * | 1/2004 | Jakubowski et al. ..... 244/137.4 |
| 2004/0108415 A1 * | 6/2004 | Foster et al. .............. 244/137.1 |

OTHER PUBLICATIONS

Ed Mygland; Pneumatic Ejector Release Unit; Proceedings 8th JOCG Aircraft/Stores Compatibility Symposium, Oct. 23–25 1990; pp. 32–14, 32–15 and 32–16; Fort Walton Beach, Florida.

* cited by examiner

*Primary Examiner*—Michael J. Carone
*Assistant Examiner*—Stephen Holzen
(74) *Attorney, Agent, or Firm*—Alston & Bird LLP (57) ABSTRACT

There is provided a store ejection system and method for mounting and ejecting a jettisonable store. The system uses a pressurized non-pyrotechnic fluid from a fluid source as the source of energy and the transfer mechanism. An actuation system includes an accumulator for receiving and storing the fluid from the pressure source, a poppet valve for controlling a flow of the fluid from the accumulator, and a controller for actuating the poppet valve to an open position in response to a control signal to jettison the store. A pneumatically-driven jettison mechanism for releasably retaining the store is fluidly connected to the poppet valve such that actuating the poppet valve to the open position releases the pressurized fluid in the accumulator to flow to the jettison mechanism, thereby actuating the jettison mechanism to jettison the store. An isolation valve, which is configured to selectively provide gas to the accumulator, can be operatively coupled to an adjustable member of the actuation system or the jettison mechanism so that the isolation valve can be closed when the poppet valve is actuated to the open position, thereby preventing further flow of the fluid from the fluid source.

25 Claims, 4 Drawing Sheets

STORE EJECTION SYSTEM WITH INTEGRAL ISOLATION VALVE AND ASSOCIATED EJECTION METHOD

BACKGROUND OF THE INVENTION

1) Field of the Invention

The present invention relates to releasable stores that are mounted on an aircraft and, more particularly, to a store ejection system having an isolation valve integral to other system components such that the isolation valve is configured to be operatively actuated by the other components, as well as an associated ejection method.

2) Description of Related Art

The term "store" is used herein to refer generally to any of a number of munitions or other materials that can be dispensed from an aircraft or other vehicle or structure. For example, military aircraft can include a store ejection system to dispense bombs, missiles, rockets, and other types of munitions. Non-munitions stores can include electronic equipment and other materials. Typically, a store ejection system includes one or more racks beneath the wings or fuselage of the aircraft for holding the stores and releasing the stores upon a command. For example, store racks are described in U.S. Pat. Nos. 5,907,118 and 6,035,759, both by the same inventor and assignee as the present invention.

In one conventional store ejection system, the stores are connected to the racks by one or more mechanical hooks. The store ejection system includes a release mechanism for actuating the hooks to release the stores and a jettison mechanism for forcibly ejecting the stores away from the aircraft. The release and jettison mechanisms can be actuated by a pressure-actuator, such as a ram that is actuated by a pressure increase in a cylinder. The pressure can be provided by a pyrotechnic cartridge, i.e., an explosive, or by a source of non-pyrotechnic compressed gas. For example, U.S. Pat. No. 5,583,312 describes a system including a compressor for compressing a non-pyrotechnic gas such as air that is used to actuate ejector pistons of one or more suspension and release equipment (S & RE) modules that releasably retain and jettison stores. Alternatively, a compressed gas can be stored in a pressure vessel on the aircraft, as described in U.S. application Ser. No. 10/205,570. The flow of pressurized gas from the pressure vessel to each of the S & RE modules is typically controlled by an isolation or enable valve. Generally, the isolation valve is a solenoid-operated valve that is electrically powered and controlled between open and closed positions. In the closed position, the isolation valve prevents the flow of the pressurized gas to an accumulator of a respective S & RE module. For example, the isolation valve can be closed to prevent fluid from flowing to the accumulator of a S & RE module from which the store is presently being released or from which the store has already been released.

While the conventional systems have proven effective for controlling the ejection of stores, a need continues to exist for improvements in the physical characteristics and operational aspects of store ejection systems. For example, desirable improvements to such systems include a reduction in weight and complexity, improved efficiency, reduced power requirements, and a reduction in required components such as logic control devices and wiring.

BRIEF SUMMARY OF THE INVENTION

The present invention provides an improved store ejection system for mounting a jettisonable store on an aircraft. The system includes an isolation valve that is actuated by the S & RE module to prevent a flow of pressurized fluid in response to the actuation of the S & RE module. For example, the isolation valve can be operatively coupled to the actuation system or the jettison mechanism of the S & RE module, thereby reducing the complexity of the system, increasing the efficiency of the system, and reducing the wiring and electrical logic components of the system.

According to one embodiment of the present invention, the system includes a fluid source capable of providing a pressurized non-pyrotechnic fluid for providing the source of energy and the transfer mechanism. The system also includes an actuation system having an accumulator configured to be selectively fluidly connected to the fluid source for receiving and storing the fluid therefrom. A poppet valve, which can be controlled by a controller that responds to a control signal to jettison the store, controls a flow of the fluid from the accumulator. A pneumatically-driven jettison mechanism for releasably retaining the store is fluidly connected to the poppet valve so that when the poppet valve is actuated to an open position, the pressurized fluid in the accumulator is released to flow to the jettison mechanism to jettison the store. The isolation valve is configured to control a flow of the fluid from the fluid source to the accumulator, and a valve control member is configured to operatively couple the isolation valve to an adjustable member of the actuation system or the jettison mechanism. Thus, the isolation valve is closed when the poppet valve is actuated to the open position, and the isolation valve thereby prevents the flow of the fluid from the fluid source.

One or more retention members can retain the store, and a drive member, which actuates the retention member to release the store, can be operatively coupled to the isolation valve to close the valve when the drive member actuates the retention member to release the store. For example, the drive member can be coupled to the isolation valve by a valve control member such as a pinion gear coupled to a rack gear on the drive member, the pinion gear defining a cam in communication with the isolation valve. The retention member can be actuated to release the store by a flow of the pressurized fluid exiting the accumulator through the poppet valve. In addition, the jettison mechanism can include at least one ejector piston for forcibly jettisoning the store away from the aircraft when the retention member has been actuated to a release position.

According to one aspect of the present invention, the accumulator defines a port in fluid communication with the isolation valve and the poppet valve. The accumulator is filled by the flow of fluid from the fluid source through the port, and the flow of fluid from the accumulator to the poppet valve and the jettison mechanism is also delivered through the port. The isolation valve can be located proximate to the accumulator and/or the poppet valve. For example, the isolation valve can be disposed in an integral body portion that also houses the poppet valve.

Another aspect of the present invention provides a method of jettisoning a store from an aircraft using a pressurized non-pyrotechnic fluid as a source of energy and a transfer mechanism. The store is releasably retained with at least one pneumatically-driven jettison mechanism, and a fluid is provided from a fluid source to an accumulator via an isolation valve. A poppet valve is actuated to fluidly connect the accumulator to the jettison mechanism so that the fluid flows from the accumulator to the jettison mechanism and actuates the jettison mechanism to jettison the store. For example, the poppet valve can be actuated by a controller in response to a control signal to jettison the store. The isolation valve is closed via an operative coupling between the isolation valve and the actuation system or jettison mechanism so that the isolation valve prevents a flow of the fluid from the fluid source while the poppet valve is in the open position.

According to one aspect of the invention, one or more retention members can retain the store, and the retention member can be actuated by a drive member that is operatively coupled to the isolation valve by the valve control member. For example, a rack gear on the drive member can rotate a pinion gear so that a cam on the pinion gear actuates the isolation valve. The retention member can be actuated by a flow of pressurized fluid exiting the accumulator that adjusts the poppet valve. In addition, the pressurized fluid exiting the accumulator through the poppet valve can actuate an ejector piston to forcibly jettison the store away from the aircraft.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
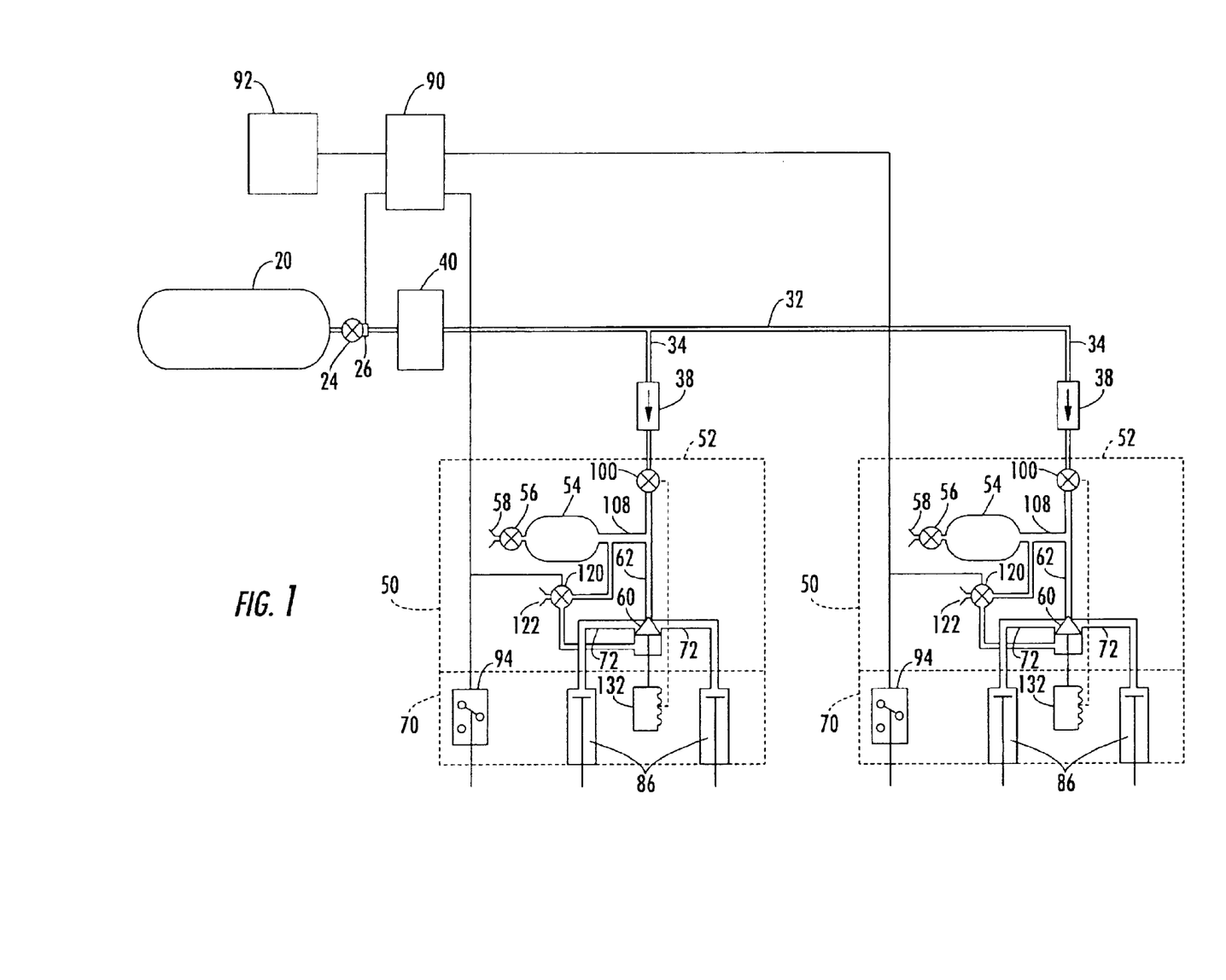
FIG. 1 is a schematic view of the store ejection system according to one embodiment of the present invention.

Referring now to FIG. 1, there is shown a pneumatically-driven store ejection system 10 according to one embodiment of the present invention. The ejection system 10 is used to releasably mount a jettisonable store 12 on an aircraft or other vehicle or structure such as a submarine or other water vessel. The store 12 can comprise any object that is to be released from the aircraft, including munitions such as bombs, missiles, rockets, and the like, and non-munitions such as surveillance, communication, or avionic devices. The ejection system 10 comprises a source of pressurized fluid 20, a pressure regulator 40 fluidly connected to the pressure source 20, at least one actuation system 52, and at least one pneumatically-driven jettison mechanism 70. A controller 90 is configured to actuate a poppet valve 60 of each actuation system 52 to an open position in response to a control signal to jettison the respective store 12.

The pressurized source 20 can be a pressure vessel, such as a replaceable pressure vessel that contains a particular volume of compressed gas, as described in U.S. patent application Ser. No. 10/205,570, titled "Store Ejection System with Replaceable Pressure Vessel," filed Jul. 25, 2002. In addition, or alternative, the source 20 can include a compressor or other pressurizing device as is described in U.S. Pat. No. 5,583,312, titled "Cold Gas Ejector Rack," issued Dec. 10, 1996. The contents of U.S. patent application Ser. No. 10/205,570 and U.S. Pat. No. 5,583,312 are incorporated in their entirety herein by reference. In any case, the pressurized source 20 preferably provides a pressurized non-pyrotechnic fluid that provides the source of energy and the transfer mechanism for the ejection system 10. Typically, the fluid is a gas such as air, nitrogen, helium or argon, and is referred to hereinafter as a gas, although other fluids can be used.

A valve or other sealing device 24 can be provided for controlling the flow of the pressurized gas from the source 20, e.g., by an actuator 26 that communicates with the controller 90 and responds to signals from the controller 90. The pressure regulator 40 can be fluidly connected to the pressure source 20 so that the pressure regulator 40 receives the pressurized gas from the source 20 when the valve 24 is opened. The pressure regulator 40 is also fluidly connected to the actuation systems 52 and configured to control a flow of the gas to the actuation systems 52. Thus, the pressure regulator 40 can be used in conjunction with the sealing devices 24 to control the flow of gas from the pressure source 20 to the actuation systems 52.

Figure 2:
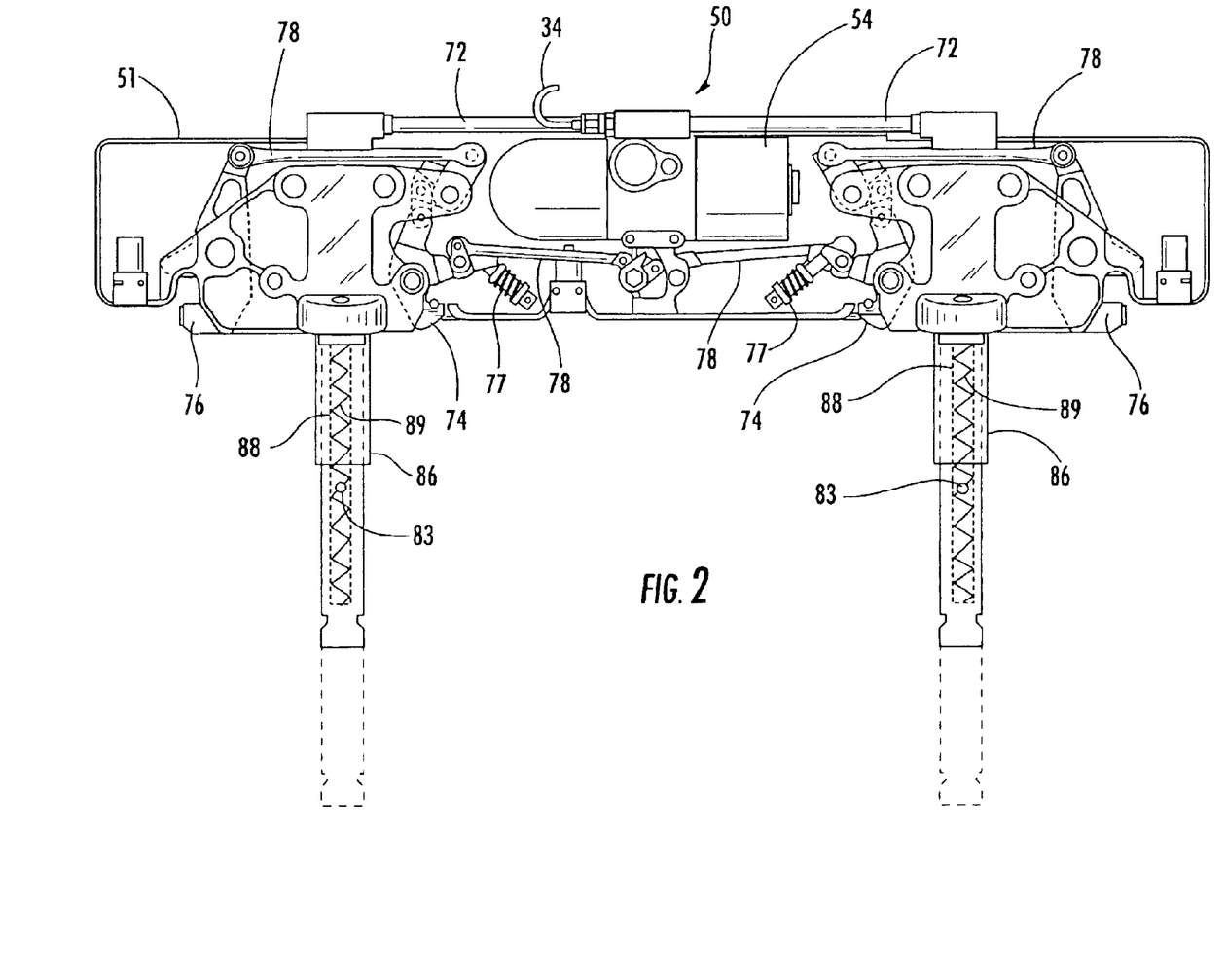
FIG. 2 is a cut-away side view of a suspension and release equipment (S & RE) module including an actuation system and an ejection mechanism according to one embodiment of the present invention and showing the range of motion of two ejector pistons.
Figure 3:
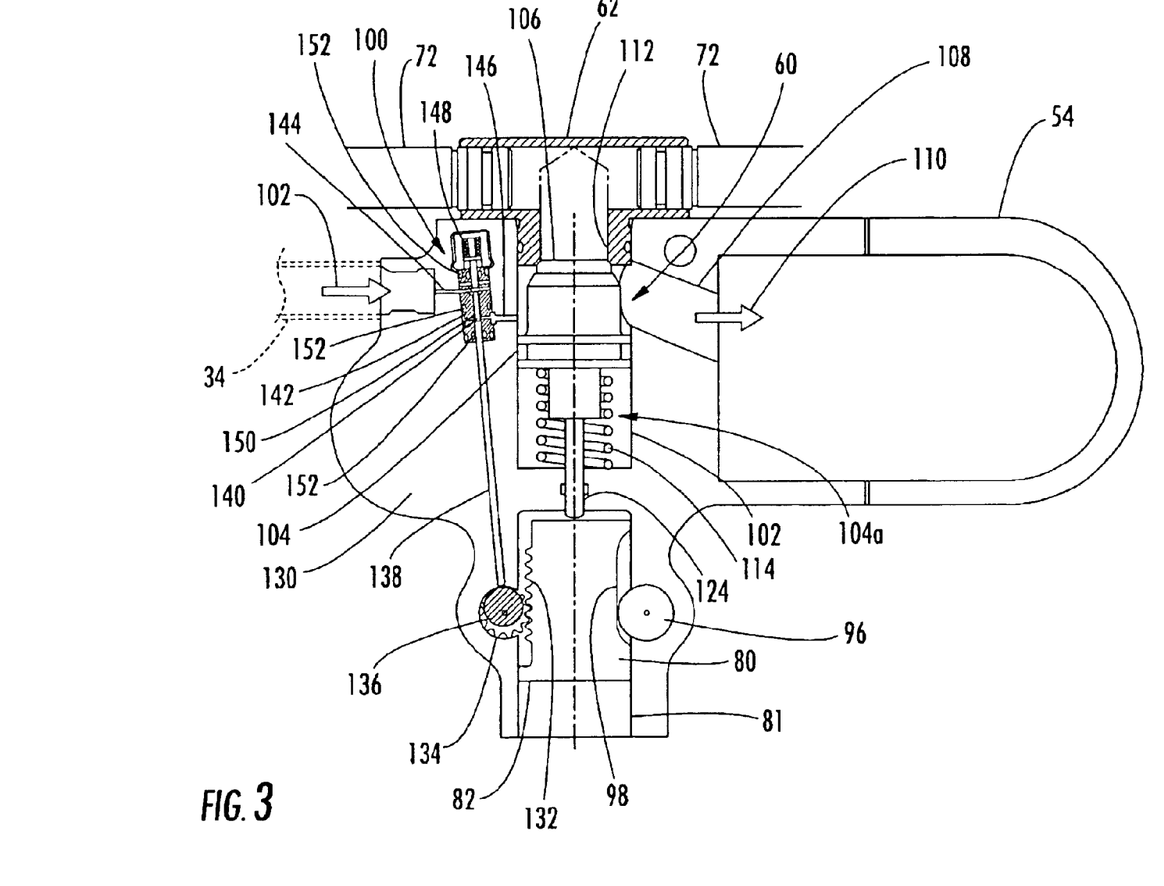
FIG. 3 is partial cut-away side view of the actuation system of the S & RE module of FIG. 2, shown with the poppet valve closed and the isolation valve open.
Figure 4:
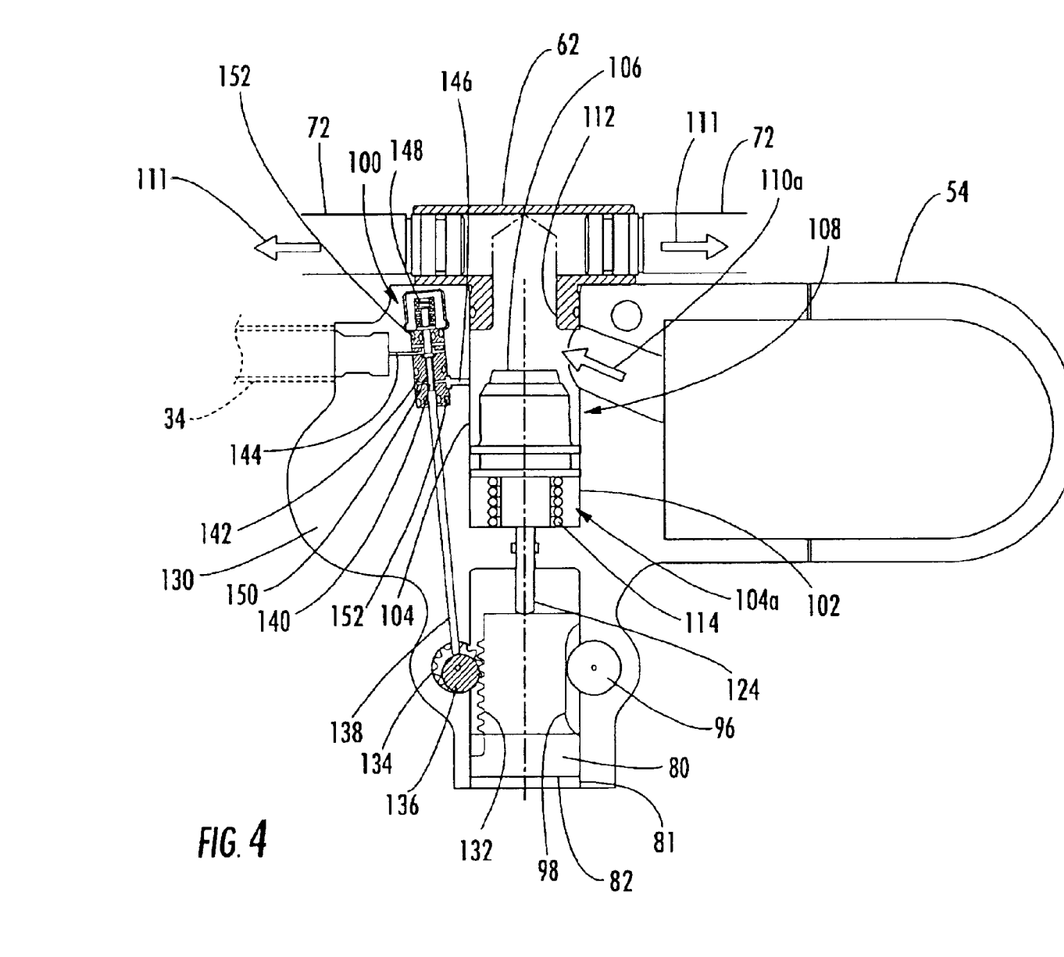
FIG. 4 is partial cut-away side view of the actuation system of FIG. 3, shown with the poppet valve open and the isolation valve closed.

In the illustrated embodiment of FIG. 1, the ejection system 10 includes two actuation systems 52 and two jettison mechanisms 70, though the ejection system 10 can include any number of actuation systems 52 and jettison mechanisms 70. Each actuation system 52 and associated jettison mechanism(s) 70 can comprise, in combination, a suspension and release equipment (S & RE) module 50, similar to the S & RE module discussed in U.S. Pat. No. 5,583,312. As shown in FIGS. 2–4, each actuation system 52 is housed in a housing 51 with one of the jettison mechanisms 70 for compactness and modularity, but various arrangements could be employed within the scope of the invention, including arrangements wherein some or all of the elements are housed within the aircraft remote from the housing 51. Further, each S & RE module 50 can include a body portion 130 that defines at least some of the elements of the S & RE module 50.

As shown in FIG. 2, the pneumatically-driven jettison mechanism 70 is configured to releasably retain and jettison the store 12. The store 12 is retained by hooks 74, 76, but other retention mechanisms can also be employed including other configurations of one or more hooks, straps, clamps, magnets, and the like. Ejector pistons 86, each of which can be retracted and extended, are used to thrust the store 12 away from the aircraft. For example, each ejector piston 86 can have multiple telescopic portions that define a common passage 88 therethrough that when filled with pressurized gas causes the piston 86 to extend. The gas is released from the pistons through vent ports 83 after extension, and the pistons 86 can be biased to the retracted configuration, for example, by one or more springs 89 so that the pistons 86 automatically retract when de-pressurized. Alternatively, the pistons 86 can be retracted manually or by other mechanisms, either before or after the aircraft has returned from its flight. Although each jettison mechanism 70 of the embodiment illustrated in FIG. 2 is shown to include a pair of pistons 86, it is also understood that each mechanism 70 can include any number of pistons 86 such as, for example, a single piston.

Referring again to FIG. 1, each actuation system 52 includes an accumulator 54, a respective ejection poppet valve 60, and a relief valve 56. The pressure regulator 40 and, hence, the source 20 are fluidly connected to the accumulator 54 via a manifold conduit 32 and feed lines 34, which extend individually from the manifold conduit 32 to each of the accumulators 54. Check valves 38 and isolation valves 100 are provided to control the flow of gas through the feed lines 34 to the individual actuation systems 52. Each of the poppet valves 60 is fluidly connected to the respective ejector pistons 86 of the associated jettison mechanism 70 via a dump valve exit passage 62 and feed tube 72, which fluidly connect, for example, to the passages 88. Thus, the ejector pistons 86 are actuated by releasing gas from the poppet valves 60 through the dump valve exit passage 62 and the feed tube 72.

In the embodiment illustrated in FIG. 2, inside hooks 74 and outside hooks 76 are employed to releasably secure the store 12 to the jettison mechanism 70, but in other embodiments, any number of hooks, including a single hook, can be configured to secure the store as is known in the art. The hooks 74, 76 can be actuated from an illustrated closed position to an open position by means of a hinged hook opening linkage 78, as is also well known in the art, which in turn, is driven by a drive member such as a hook opening piston 80 that is reciprocallably slidable in a piston chamber 81, shown in FIG. 3. For example, the piston 80 can be configured to slide in the chamber 81 in rolling contact with a roller or bearing 96 disposed in the chamber 81 and configured to contact a slot 98 defined by the piston 80. The hook opening piston 80 is reciprocatingly driven (toward the bottom of the page) by the flow of gas from the accumulator 54 through port 108 as the poppet valve 60 is adjusted from the closed position to an open position. Thus, the gas not only is the source of energy, but also the transfer mechanism to release the stores 12. At the same time, pressurized gas is also permitted by the open poppet valve 60 to flow through the dump valve exit passage 62 and into the feed tube 72, thereby actuating the ejector pistons 86 to thrust the store 12 away from the aircraft simultaneously with its release from the hooks 74, 76. Springs 77 can be provided for biasing the hook opening linkage 78, and thus the hooks 74, 76, to the open and/or closed positions.

As shown in FIGS. 3 and 4, the accumulator 54 is configured to receive the pressurized gas through the isolation valve 100. The isolation valve 100 can be adjusted between an open position (FIG. 3) and a closed position (FIG. 4). In the open position, the pressurized gas can flow from the feed line 34 in direction 102 through the isolation valve 100, through a generally cylindrical chamber 104 housing a poppet 106 of the poppet valve 60, and through the port 108 in direction 110 into the accumulator 54.

The poppet 106 of the poppet valve 60 can fluidly separate a first portion 104a of the chamber 104 from the rest of the chamber 104 and from the accumulator 54 and the exit passage 62. Thus, a pressurized gas in the first portion 104a of the chamber 104 urges the poppet 106 against a seal 112 of the valve 60. A spring 114 can also be disposed in the first portion 104a of the chamber 104 to bias the poppet 106 against the seal 112. The pressure in the first portion 104a of the chamber 104 can be provided by a dump control valve 120 (FIG. 1). That is, the dump control valve 120 can selectively connect the first portion 104a of the chamber 104 to a high pressure source, such as the accumulator 54, and a low pressure source, such as a vent 122 to the atmosphere. Thus, when the dump control valve 120 is adjusted to connect the first portion 104a of the chamber 104 to the accumulator 54, the poppet 106 is urged against the seal 112 and the poppet valve 60 is closed (FIG. 3) so that gas cannot flow from the accumulator 54 to the exit passage 62. When the dump control valve 120 is adjusted to connect the first portion 104a of the chamber 104 to the vent 122, the pressurized gas in the accumulator 54 provides a force sufficient to compress the spring 114 and urge the poppet 106 away from the seal 112, thereby opening the poppet valve 60 (FIG. 4). Thus, the position of the poppet valve 60 can be selectively controlled by the dump control valve 120.

The dump control valve 120 is configured to communicate with the controller 90 so that the controller 90 can control the dump control valve 120 and, hence, the poppet valve 60. Control valves that selectively provide different pressures for actuating a sliding member in a chamber are further described in U.S. Pat. No. 6,347,768, titled "Automatic and Sequencing Actuation Assembly for a Weapon Ejection System and Associated Method," issued Feb. 19, 2002; U.S. Pat. No. 5,857,647, titled "Integral Accumulator Valve and Ram Assembly for Pneumatic Weapon Ejection System," issued Jan. 12, 1999; and U.S. Pat. No. 6,035,759, titled "Single Hook Ejector Rack for Miniature Munitions," issued Mar. 14, 2000, the entirety of each of which is incorporated herein by reference. Further, it is appreciated that other mechanisms can be used to selectively open and close the poppet valve 60.

As illustrated in FIGS. 3 and 4, each isolation valve 100 can be controlled by the motion of one or more of the elements of the respective actuation system 52 and/or jettison mechanism 70. Advantageously, the isolation valve 100 can be operatively coupled to the actuation system 52 or the jettison mechanism 70 for this purpose. For example, a post 124 or other member can extend from the poppet 106 of the poppet valve 60 in communication with an adjustable drive member so that the post 124 actuates the drive member when the poppet valve 60 moves to the open position. The adjustable drive member, in turn is operatively coupled to the isolation valve 100 by a valve control member. In the illustrated embodiment, the drive member is one of the hook opening pistons 80, which is slidably adjustable between retracted and advanced positions (FIGS. 3 and 4, respectively) in the piston chamber 81 defined by the S & RE module 50. As the hook opening piston 80 is advanced, a drive surface 82 of the piston 80 is urged against the hinged hook opening linkage 78 to release the store 12.

The piston 80 defines a rack gear 132, and the valve control member is a pinion gear 134 that is rotatably mounted in engagement with the rack gear 132 of the piston 80. The valve control member also defines a cam 136 configured to rotate with the pinion gear 134 and contact a pushrod 138 extending to the isolation valve 100. In particular, the cam 136 is configured in an eccentric configuration so that when the poppet valve 60 is in the closed position and the piston 80 has not been actuated by the post 124 (FIG. 3), the cam 136 holds the pushrod 138 against a stop member 140 of the isolation valve 100 so that the stop member 140 is unseated from a primary seal block 142 of the isolation valve 100. With the stop member 140 unseated, pressurized gas in the line 34 can flow into an inlet 144 of the isolation valve 100, through an orifice 150 of the primary seal block 142, and through an outlet 146 of the isolation valve 100 to the accumulator 54.

In operation, as the poppet valve 60 opens and the piston 80 is moved in a first direction, i.e., toward the bottom of the page as shown in FIGS. 3 and 4, the valve control member 120 is rotated by the piston 80 and the eccentric cam 136 is rotated to a position (FIG. 4) in which the pushrod 138 is no longer held against the stop member 140 of the isolation valve 100. A spring 148 in the isolation valve 100 biased against the stop member 140 urges the stop member 140 against the primary seal block 142 so that the stop member 140 seals the orifice 150 of the seal block 142 as shown in FIG. 4, preventing the flow of gas therethrough. O-rings or other seals 152 can be provided for preventing the flow of gas through other portions of the isolation valve 100. Thus, when the poppet valve 60 is adjusted to the open position, the flow of gas through the isolation valve 100 is prevented, thereby preventing a flow of gas from the line 34 to the jettison mechanism 70. Accordingly, pressurized gas from the line 34 can be substantially prevented from flowing directly to the jettison mechanism 70 after the jettison mechanism 70 is actuated and the store 12 is released.

In one exemplary manner of operation of the present invention, each S & RE module 50 is initially in an unpressurized state. Loading of the store 12 onto each of the jettison mechanisms 70 of the S & RE module 50 triggers a store present switch 94 provided in each module 50. The store present switch 94 is in electrical communication with the controller 90, and the store present switch 94 communicates a "store present" signal to the controller 90 upon loading of the store 12. After the store 12 is loaded, the controller 90 opens the sealing device 24, for example, according to a controller operation program. Gas then flows from the pressure source 20 through the manifold conduit 32 and feed lines 34 to the accumulators 54 of the S & RE modules 50.

The pressure regulator 40 controls the flow of gas into the accumulators 54 so that the pressure in the accumulators 54 is maintained at a prescribed operating pressure. The operating pressure, which in one embodiment is approximately 6000 psi, can be maintained in the accumulator 54 by adding gas from the pressure source 20 or venting gas through the relief valves 56 to vents 58 open to the atmosphere. For example, each relief valve 56 can be a mechanical overpressure valve that is mechanically configured to open when the pressure in the respective accumulator 54 exceeds the operating pressure by more than a predetermined pressure interval. Alternatively, pressure sensors (not shown) can be used to monitor the pressure in each of the accumulators 54 and communicate with a pressure controller that controls the addition of gas to the accumulators 54 through the pressure regulator 40 and venting of gas through the relief valves 56. Additional gas may be required in one or more of the accumulators 54 due to ambient temperature and pressure changes, for example, due to altitude changes of the aircraft. Alternatively, the accumulators 54 can be vented in response to changes in altitude, temperature, or other conditions. The accumulators 54 can also be vented after the store 12 has been jettisoned from each accumulator 54, either before or after the aircraft lands. For example, after the aircraft lands, a ground crew member can manually actuate one or more of the relief valves 56 to release the pressurized gas from the accumulators 54.

The controller 90 is also in electrical communication with an ejection initiator, such as a store management system (SMS) 92 as is known in the art for controlling the release and jettison of stores, or a manual release switch (not shown) that is activated by a member of the aircraft crew. Upon activation, the ejection initiator issues a control signal to eject one or more of the stores 12. The controller 90 receives the control signal and opens the corresponding dump control valve 120, thereby actuating the corresponding poppet valve 60 to the open position and permitting pressurized gas to flow from the accumulator 54 in direction 110a through port 108 to the jettison mechanism 70 in directions 111 to pressurize and drive each of the ejector pistons 86 to their extended positions. The gas drives the hook opening piston 80 downwardly to actuate the hooks 74, 76 and release the store 12. The hooks 74, 76 release the store 12, and the ejector pistons 86 thrust the store 12 clear of the aircraft. As the hooks 74, 76 open, the store present switch 94 detects a "store absent" condition, which is transmitted to the controller 90. At the end of the ejector piston stroke, vent ports 83 are exposed, as shown in FIG. 2, preferably discharging substantially all residual accumulator pressure and permitting the springs 89 to retract the ejector pistons 86 to their retracted position. Thus, the S & RE module 50 may be operated to remain fully discharged and dormant after firing its store, resulting in both greater flight safety and a safer environment for working on the aircraft after landing. Alternatively, it may sometimes be desirable to retain some of the residual accumulator pressure to reduce the charge time and gas necessary to recharge the system for the next firing.

After the store 12 has been released, the dump control valve 120 is typically returned to the closed position to prevent further flow of gas from the accumulator 54 to the jettison mechanism 70. For example, the controller 90 can adjust the dump control valve 120 to connect the first portion 104a of the chamber 104 of the poppet valve 60 to the vent 122 for a predetermined period, such as about 200 ms, and then return the dump control valve 120 to connect the first portion 104a of the chamber 104 to the accumulator 54 (or other high pressure source). As illustrated in FIGS. 3 and 4, the piston 80 is not fixed to the post 124. Therefore, the piston 80 is not retracted by the movement of the post 124 as the poppet 106 of the poppet valve 60 is returned to seal against the seal 112. After release of the store 12, the piston 80 can be returned to a particular position, e.g., against the post 124 as shown in FIG. 3, by springs or other biasing devices. Alternatively, the piston 80 can remain in the configuration shown in FIG. 4 after release of the store 12, even after the poppet valve 60 is closed.

While the adjustable drive member of the illustrated embodiment is the hook opening piston 80, it is also appreciated that other members of the actuation system 52 or jettison mechanism 70 can be operatively coupled to the isolation valve 100 and function as the drive member to actuate the isolation valve 100 between open and closed positions. In addition, the valve control member that provides the coupling between the isolation valve 100 and the drive member can include various types of mechanical connections and linkages. Advantageously, the coupling between the isolation valve 100 and the actuation system 52 and/or the jettison mechanism 70 provides an efficient and reliable actuation mechanism for opening and closing the gas connection between the line 34 and the jettison mechanism 70 through the isolation valve 100. Further, where a mechanical coupling is used to connect the isolation valve 100 to the drive member, an electromechanical device such as a solenoid typically need not be provided solely for actuating the isolation valve 100 in response to the controller 90.

It is also appreciated that the isolation valve 100 can be structured in various configurations for delivering gas to the accumulator 54 and the jettison mechanism 70. For example, as illustrated in FIGS. 3 and 4, the isolation valve 100 is disposed in the integral body portion 130 of the S & RE module 50 that also houses the poppet valve 60. Further, the isolation valve 100 can be configured to fill the accumulator 54 through the same port 108 through which the accumulator 54 delivers the gas to the poppet valve 60 and the jettison mechanism 70. In other embodiments of the present invention, however, the isolation valve 100 can be structured separately from the body 130 of the S & RE module 50 housing the poppet valve 60 and/or the accumulator 54. Further, the isolation valve 100 can be configured to provide gas to the accumulator 54 through a port other than the port 108 through which the accumulator 54 fluidly communicates with the poppet valve 60 and/or the jettison mechanism 70.

Many modifications and other embodiments of the invention set forth herein will come to mind to one skilled in the art to which this invention pertains having the benefit of the teachings presented in the foregoing descriptions and the associated drawings. For example, the controller 90 and the store management system (SMS) 92 can be a single device or each can comprise multiple components, as is known in the art. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A store ejection system for mounting a jettisonable store, the store ejection system using a fluid as a source of energy and a transfer mechanism and comprising:

S a fluid source capable of providing a pressurized non-pyrotechnic fluid for providing the source of energy and the transfer mechanism;

an actuation system comprising an accumulator configured to be selectively fluidly connected to the fluid source for receiving and storing the fluid from the fluid source, a poppet valve for controlling a flow of the fluid from the accumulator, and a controller for actuating the poppet valve to an open position in response to a control signal to jettison the store;

a pneumatically-driven jettison mechanism for releasably retaining the store, the jettison mechanism fluidly connected to the poppet valve such that actuating the poppet valve to an open position releases the pressurized fluid in the accumulator to flow to the jettison mechanism, thereby actuating the jettison mechanism to jettison the store;

an isolation valve configured to control a flow of the fluid from the fluid source to the accumulator; and a valve control member configured to operatively couple the isolation valve to an adjustable member of at least one of the actuation system and the jettison mechanism such that the isolation valve is closed when the poppet valve is actuated to the open position, the isolation valve thereby preventing the flow of the fluid from the fluid source to the accumulator.

2. A store ejection system according to claim 1 further comprising at least one retention member for retaining the store and a drive member for actuating the retention member to release the store, the drive member being operatively coupled to the isolation valve such that the drive member closes the isolation valve when the drive member actuates the retention member to release the store.

3. A store ejection system according to claim 2 wherein the valve control member comprises a pinion gear coupled to a rack gear on the drive member, the pinion gear defining a cam in communication with the isolation valve.

4. A store ejection system according to claim 2 wherein the retention member is configured to be actuated to release the store by a flow of the pressurized fluid exiting the accumulator through the poppet valve.

5. A store ejection system according to claim 2 wherein the jettison mechanism further comprises at least one ejector piston for forcibly jettisoning the store when the retention member has been actuated to a release position, the ejector piston being actuated to jettison the store by the pressurized fluid exiting the accumulator through the poppet valve.

6. A store ejection system according to claim 1 wherein the accumulator defines a port in fluid communication with the isolation valve and the poppet valve such that the accumulator is filled by the flow of fluid from the fluid source through the port and the flow of fluid from the accumulator to the jettison mechanism is delivered through the port.

7. A store ejection system according to claim 1, further comprising an integral body portion housing the isolation valve and the poppet valve.

8. A store ejection system according to claim 1, further comprising a relief valve configured to vent the fluid from the accumulator to reduce the pressure in the accumulator to below a maximum operating pressure.

9. A suspension and release equipment module for jettisoning a store, the module using a pressurized non-pyrotechnic fluid as a source of energy and a transfer mechanism and comprising:

an accumulator configured to receive the fluid from a fluid source and store the fluid;

a poppet valve for controlling a flow of fluid from the accumulator;

a jettison mechanism for releasably retaining the store, the jettison mechanism fluidly connected to the accumulator via the poppet valve;

an isolation valve configured to control a flow of the fluid into the accumulator; and a valve control member configured to operatively couple the isolation valve to at least one of the actuation system and the jettison mechanism such that the isolation valve is configured to be closed when the poppet valve is actuated to the open position, the isolation valve thereby preventing the flow of the fluid to the accumulator.

10. A suspension and release equipment module according to claim 9, further comprising at least one retention member for retaining the store and a drive member for actuating the retention member to release the store, the drive member being operatively coupled to the isolation valve such that the drive member closes the isolation valve when the drive member actuates the retention member to release the store.

11. A suspension and release equipment module according to claim 10 wherein the valve control member comprises a pinion gear coupled to a rack gear on the drive member, the pinion gear defining a cam in communication with the isolation valve.

12. A suspension and release equipment module according to claim 10 wherein the retention member is configured to be actuated to release the store by a flow of the pressurized fluid exiting the accumulator through the poppet valve.

13. A suspension and release equipment module according to claim 10 wherein the jettison mechanism further comprises at least one ejector piston for forcibly jettisoning the store when the retention member has been actuated to a release position, the ejector piston being actuated to jettison the store by the pressurized fluid exiting the accumulator through the poppet valve.

14. A suspension and release equipment module according to claim 9 wherein the accumulator defines a port in fluid communication with the isolation valve and the poppet valve such that the accumulator is filled by the flow of fluid through the port and the flow of fluid from the accumulator to the jettison mechanism is delivered through the port.

15. A suspension and release equipment module according to claim 9, further comprising an integral body portion housing the isolation valve and the poppet valve.

16. A suspension and release equipment module according to claim 9, further comprising a relief valve configured to vent the fluid from the accumulator to reduce the pressure in the accumulator to below a maximum operating pressure.

17. A suspension and release equipment module according to claim 9, further comprising a controller for actuating the poppet valve to an open position in response to a control signal to jettison the store, thereby closing the isolation valve.

18. A method of jettisoning a store from an aircraft using a pressurized non-pyrotechnic fluid as a source of energy and a transfer mechanism, the method comprising:

releasably retaining the store with at least one pneumatically-driven jettison mechanism;

providing a fluid from a fluid source to an accumulator via an isolation valve;

actuating a poppet valve fluidly connected to the accumulator to an open position to fluidly connect the accumulator to the jettison mechanism such that the fluid flows from the accumulator to the jettison mechanism and thereby actuates the jettison mechanism to jettison the store; and closing an isolation valve via an operative coupling between the isolation valve and at least one of the actuation system and the jettison mechanism such that the isolation valve prevents a flow of the fluid from the fluid source to the accumulator while the poppet valve is in the open position.

19. A method according to claim 18 wherein said releasably retaining step comprises retaining the store with at least one retention member, and said actuating and closing steps comprise actuating the retention member to release the store via a drive member operatively coupled to the isolation valve by the valve control member such that the drive member closes the isolation valve when the drive member actuates the retention member to release the store.

20. A method according to claim 19 wherein said actuating and closing steps comprise rotating a pinion gear coupled to a rack gear on the drive member and thereby actuating the isolation valve via a cam on the pinion gear.

21. A method according to claim 19 wherein said actuating step comprises adjusting the poppet valve with a flow of pressurized fluid exiting the accumulator and thereby actuating the retention member to release the store.

22. A method according to claim 19, further comprising actuating an ejector piston by the pressurized fluid exiting the accumulator through the poppet valve and thereby forcibly jettisoning the store when the retention member has been actuated to a release position.

23. A method according to claim 18 wherein said providing and actuating steps comprise providing the fluid to the accumulator and releasing the fluid from the accumulator through a port in fluid communication with the isolation valve.

24. A method according to claim 18, further comprising venting the fluid from the accumulator through a relief valve to reduce the pressure in the accumulator to below a maximum operating pressure.

25. A method according to claim 18 wherein said actuating step comprises actuating the poppet valve to an open position by a controller in response to a control signal to jettison the store.

* * * * *